(No Model.)
A. H. DORNEY.
HOOF PAD FOR HORSES.
No. 593,960. Patented Nov. 16, 1897.
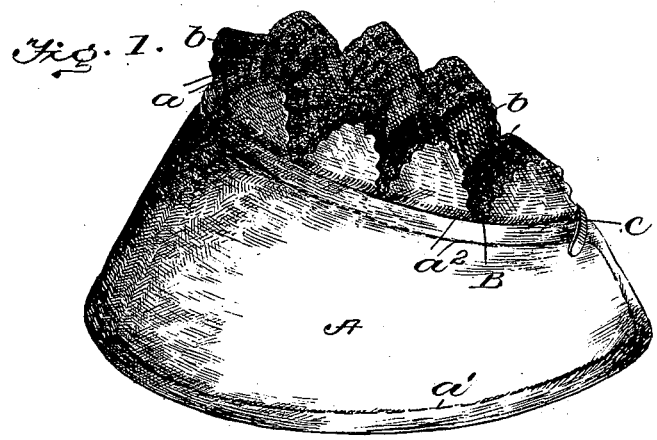
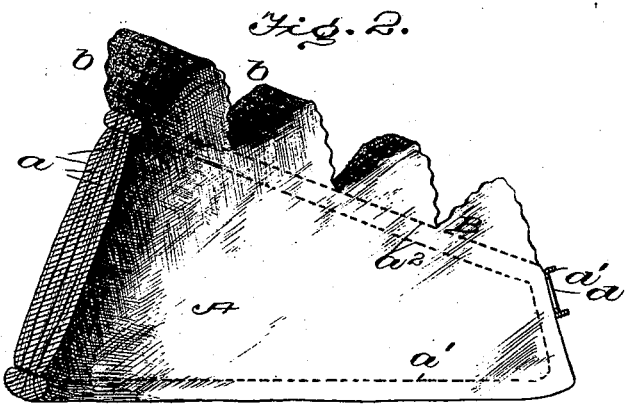
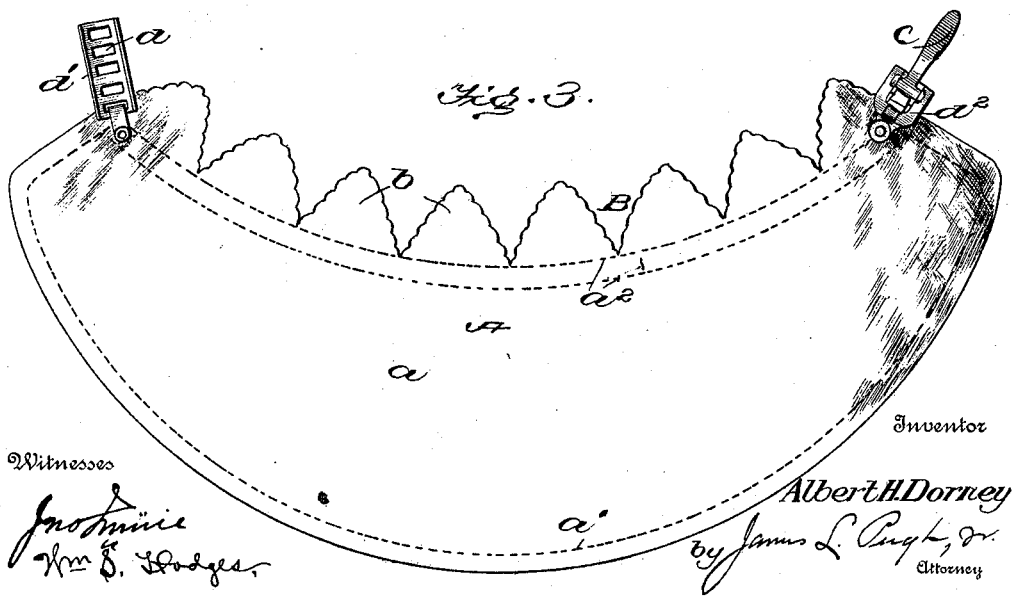
Witnesses
Inventor
Albert H. Dorney
by James L. Pugh Jr.
Attorney

UNITED STATES PATENT OFFICE.

ALBERT H. DORNEY, OF ALLENTOWN, PENNSYLVANIA.

HOOF-PAD FOR HORSES.

SPECIFICATION forming part of Letters Patent No. 593,960, dated November 16, 1897.

Application filed June 9, 1897. Serial No. 640,066. (No model.)

*To all whom it may concern:*

Be it known that I, ALBERT H. DORNEY, of Allentown, in the county of Lehigh and State of Pennsylvania, have invented certain new and useful Improvements in Hoof-Pads for Horses; and I do hereby declare the following to be a full, clear, and exact description of the invention, such as will enable others skilled in the art to which it appertains to make and use the same.

This invention contemplates certain new and useful improvements in hoof-pads for horses.

The object of the invention is to provide an extremely simple and inexpensive pad to aid in removing all fever from the feet, cure sore-footed horses, and prevent the contraction of the hoof.

I have found by actual experience that water is the best remedy for equine fever and for keeping the feet of a horse in a healthy state. The use of chemicals is not necessary. It is essential, however, that moisture be retained around the hoof for a considerable period of time, averaging about twenty-four hours, if not continuous.

My improved pad is composed of a series of layers of soft felt attached together along their lower edges and ends and near their upper edges, the extreme ends of the upper edges being left free and disconnected, forming a sponge-like surface that will constitute a ready absorbent for water applied thereto, allowing the same to soak down into the pad and transmit the moisture down to the hoof on which the pad is attached.

The invention will be hereinafter fully set forth, and particularly pointed out in the claims.

In the accompanying drawings, Figure 1 is a view in perspective of my improved hoof-pad. Fig. 2 is a cross-sectional view. Fig. 3 is a view of the pad extended.

Referring to the drawings, A designates a pad so shaped in its entirety as to conform to and inclose the hoof of a horse's foot. When opened or flattened, the pad is of approximately crescent shape. (See Fig. 3.) This pad is made up of a series of layers $a$ of felt-cloth. A line of stitches $a'$ extends along the ends of the pad and also along the lower edge thereof, serving to securely hold together the series of layers of felt. Two rows $a^2$ of stitches extend around the pad a short distance below the upper edge B thereof, the same serving to unite and hold together the series of felt at the top of the pad. The edge B is preferably fluted, the whole forming a series of sponge-like portions $b$, all of which are disconnected save at the line of stitches $a^2$.

C is a clasp secured to one end of the pad and designed to be inserted through any one of a series of slots $d$ in a pivoted plate $d'$, attached to the other end of the pad, whereby the latter may be locked or clasped on the horse's hoof. The clasp is preferably of the pivoted form, so that when once inserted through one of the slots $d$ it can be turned down over on its own securing-plate $d^2$.

In practice the pad is thoroughly soaked in water. The upper sponge-like portions B being disconnected and opened at their tops, water can readily pass down into the body of the pad. The moisture of the pad is readily transmitted to the horse's hoof. I have found that horses suffering from hard, dry, brittle, and contracted feet, toe-sand, quarter-cracks, corns, navicular disease, coronitis, false quarters, side bones, laminitis in the acute, sub-acute, or chronic form, or for any injury or disease of the foot relief and cure can be had by wetting the pad twice a day. If the horses are foundered, the pad should be wet with warm water every two hours. For healthy feet the pad should be applied, when wet, one or two nights a week. It will retain moisture for at least twenty-four hours.

The advantages of my invention are apparent to those skilled in the art. It will be seen that I have provided an extremely simple and inexpensive pad for retaining moisture around the hoof of a horse's foot. The pad has a sponge-like action and readily absorbs and retains the water and keeps the hoof moistened.

I claim as my invention—

1. A hoof-pad composed of a series of layers of felt-cloth united together along their ends, lower edges, and near their upper top edges, the latter being left free and open above such point of union, forming an upper sponge-like portion, as set forth.

2. A hoof-pad composed of a series of layers of felt-cloth united together along their lower edges, at the ends, and adjacent to the top edges, which latter are fluted to form curved projections, the layers being free and disconnected above said upper union, forming an upper sponge-like portion, as set forth.

3. A hoof-pad composed of a series of layers of felt-cloth, the upper edges of which are disconnected, forming an upper sponge-like portion, said layers being connected together below said upper edges, substantially as set forth.

In testimony whereof I have signed this specification in the presence of two subscribing witnesses.

ALBERT H. DORNEY.

Witnesses:
WM. H. SOWDEN,
ALLEN H. FOCHT.